United States Patent [19]
Johnston

[11] 4,161,837
[45] Jul. 24, 1979

[54] FISHING HOOK BAIT MOLD

[76] Inventor: Gerald M. Johnston, 954 Tiger Tail Rd., Vista, Calif. 92083

[21] Appl. No.: 861,121

[22] Filed: Dec. 16, 1977

[51] Int. Cl.² ............................................. A01K 97/00
[52] U.S. Cl. .......................................... 43/4; 249/92; 249/94; 249/95
[58] Field of Search ....................... 249/92, 94, 95, 96, 249/97; 43/4, 42.37, 42.33; 425/18

[56] References Cited

U.S. PATENT DOCUMENTS

| | | | |
|---|---|---|---|
| 1,259,141 | 3/1918 | Schoenman et al. | 249/95 |
| 1,538,789 | 5/1925 | Flemming | 249/95 X |
| 1,639,122 | 8/1927 | Whitman | 425/318 X |
| 1,711,369 | 4/1929 | Wade | 249/97 |
| 2,846,803 | 8/1958 | Rettig | 43/4 |
| 3,709,458 | 1/1973 | Mattson | 249/95 |
| 3,930,329 | 1/1976 | Burkhardt | 249/95 X |

Primary Examiner—William R. Briggs
Attorney, Agent, or Firm—Robert D. Farkas

[57] ABSTRACT

A fishing hook bait mold utilizes a pair of mold halves each pivotably secured to another and having a pair of mating faces. Projections and projection receiving openings align the mold halves in a closed condition wherein a pair of open mouth cavities each communicate with one another by way of an internal passageway. One of the cavities, partly formed in each of the mold halves, is smaller than the other cavity, similarly formed, each having an open mouth portion on opposite sides of the mold. A fish hook is installed having the fishing line end disposed in one cavity and the barb end in another. Pliable bait material, such as dough or the like, is forced into the open mouth portion of the barb containing cavity such that the dough is formed tightly about the fish hook. Opening the mold permits the baited hook to be removed from the mold.

7 Claims, 3 Drawing Figures

FISHING HOOK BAIT MOLD

BACKGROUND OF THE INVENTION

1. The Field of the Invention

This invention relates to molds for forming foodstuffs and the like, and more particularly to that class of mold having a holding device for an internally supported metallic element about which a moldable material is secured.

2. Description of the Prior Art

The prior art abounds with molds for a wide variety of semirigid deformable foodstuffs. U.S. Pat. No. 436,818 issued Sept. 23, 1890 to W. G. Wiatt teaches a mold for making popcorn balls. Such mold includes a plier-like device having at the pincer ends of the apparatus a pair of hemispherical balls, one of which is provided having a rim-like open mouth portion, adapted to receive therein the open mouth portion of the other hemispherical ball. Each ball contains a hollowed out portion for receiving a foodstuff therein. When the mold is closed, by applying a compressive force to the proximal end of the pincer apparatus, the mold halves are brought into contact with each other causing the foodstuff to be compressed whilst being contained in the mold. Such apparatus does not provide for the introduction of a metallic-like insert which may have the foodstuff molded thereabout.

U.S. with a No. 2,956,521 issued Oct. 18, 1960 to P. Misch discloses a pirogi maker having a pair of clamshell-like halves each pivotably secured to each other and provided with a pair of arm-like extensions disposed adjacent the arcuately shaped edges of the clam-like halves. Fluted marginal edges disposed in conjugate mating relationship permit the flat, moldable, deformable foodstuff to be disposed in conventional shape about a foodstuff core when the mold halves clamp to dough-like outer material together.

U.S. Pat. No. 3,767,343 issued Oct. 23, 1973 to H. Pichonsky discloses a pyrohy maker in which a pair of plastic concavo-convex halves are hinged together on one edge with the perimeters engaging one another when closed to form cutting edges for trimming the dough. A T-shaped stem extends from one half and is engaged between the second and third fingers thus anchoring the device in the hand and enabling the entire forming operation to be accomplished with one hand. The Pichonsky device, as well as the apparatus of Misch each fail to provide an apparatus which is useful in molding a pliable foodstuff, such as cheese or dough about a rigid material, other than the foodstuff, especially of the type partially extending outwardly from the moldable foodstuff when disposed in a molded shape.

SUMMARY OF THE INVENTION

A primary object of the present invention is to provide a bait molder for fishing hooks suitable for molding an edible material about a fishing hook such that the user's hand is never endangered from being caught upon the barb-like end of the hook.

Another object of the present invention is to provide a bait mold which is inexpensive to manufacture, durable in construction, economical to use and well suited for its purpose.

Still another object of the present invention is to provide a bait mold which can accommodate a variety of sizes of fish hooks therein.

Yet another object of the present invention is to provide a bait mold which can mold bait onto fish hooks already strung onto lines.

A further object of the present invention is to provide a bait hook which, because of its inexpensive cost, can be utilized to guard a fish hook when such hook is not in use.

Another object of the present invention is to provide a fishing hook mold which may be easily cleaned.

Still another object of the present invention is to provide a hook mold which permits the moldable edible material comprising the bait to be formed into the required shape utilizing only the thumb of the user.

Certain types of fishing procedures are best carried out utilizing bait of the type consisting of a moldable foodstuff rather than foodstuffs similar to diced fish, meat, worms, flies and the like. Included in this class of moldable foodstuff are cheeses, dough-like materials and the like. Because such moldable materials do not readily adhere to a fish hook and maintain a secure position threaded thereonto in normal fishing service, experienced fishermen prefer to compress such moldable foodstuff onto barbed end of a fish hook utilizing a kneading-rolling operation between the balls of the fingers. Such procedure is dangerous and difficult to perform, besides being wasteful of the foodstuff. The present invention contemplates these difficulties and provides a small effective mold, totally safe in use, which permits two sizes of cavities useful in forming moldable bait into a desired shape about the fish hooks of varying size. Such fish hook may carry line thereon. The molds are small and compact and permit the thumb of the user to mold the bait without running any risk of any kind of becoming impaled on the sharpened barbed-like end of the hook. After use, the mold may be utilized as a fish hook guard, either retaining the moldable bait material about a fish hook, or simply performing the service of shielding the fish hook against accidental entanglement with portion of the line or the skin of the user.

These objects as well as other objects of the present invention, will become more readily apparent after reading the following description of the accompanying drawings.

DESCRIPTION OF THE PREFERRED EMBODIMENT

The structure and method of fabrication of the present invention is applicable to a two-cavity mold. The mold is fabricated having two major body portions. Each body portion is pivotably secured to one another adjacent a flat surface portion of each mold adapted to engage one another in juxtaposed relationship when the mold is in a closed condition. Each half body portion is provided having a hemispherical cavity portion, which engaged with the adjacent oppositely formed cavity portion provides a semispherical cavity which is provided having an open mouth portion disposed on an outermost surface of the mold. Such cavity is coupled to another similar cavity of somewhat smaller size, utilizing an elongated passageway for connecting purposes. Both open mouth portions reside parallel to one another in spaced apart relationship extending transverse to the longitudinal axis of the communicating passageway disposed centered about the plane of the abutting surfaces of the mold halves. One of the mold halves is provided having four small projections extending upwardly from the mating surface, while the other mold half is provided having four openings adapted to receive the projections so as to maintain the mold halves in exact alignment thereby providing a smooth walled surface for the cavities.

In use, a fishing hook is disposed having the barb-like end thereof engaged in one of the cavities and having the line receiving end thereof disposed in the other cavity such that the shaft portion of the hook is disposed extending along the length of the communicating passageway. The moldable foodstuffs of any suitable variety, is inserted into the open mouth portion of the cavity having the barb-like end of the fishing hook. Enough bait material is forced into such open mouth cavity so as to cover the entire barb-like end of the fishing hook. An inwardly directive force, preferably applied with the thumb of the user, causes the foodstuff to compress and to form a molded bullet-like shape bait slug, molded about the hook end of the fishing hook. The mold is then pivoted into an open position permitting the hook to be withdrawn from the mold having the bait material secured to the barb end of the hook.

The mold may be fabricated from two parts, each of a similar plastic-like material, preferably polypropylene. The hinges may be of any convenient variety, such as a pin and socket type hinge arrangement, or if desired, a living hinge. Thus, the mold may be fabricated in a unitary construction. When a smaller hook is utilized, the barb-like end is installed in a smaller cavity and the line receiving end is disposed in the larger cavity so as to facilitate a small amount of bait material being formed or molded about the barb-like end of the fishing hook.

Figure 1:
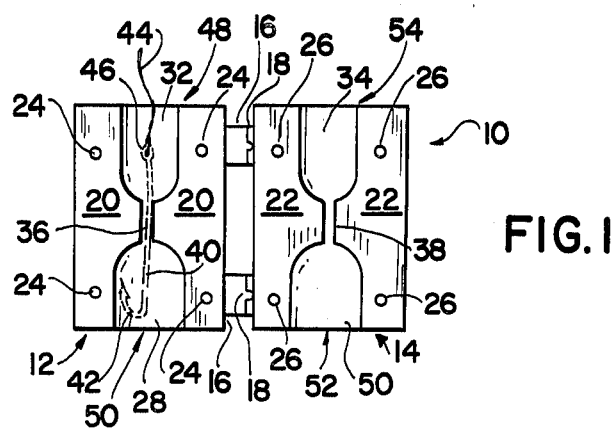
FIG. 1 is a side elevation view of the present invention shown in an opened condition.

Now referring to the figures, and more particularly to the embodiment illustrated in FIG. 1 showing the present invention 10 including a mold half 12 and mold half 14 shown pivotably secured to one another utilizing hinge portions 16 and 18 therefor. Lateral surfaces 20 engage lateral surfaces 22 when the mold is disposed in a closed condition. Projections 24 engage openings 26 when the mold is closed. Mold half 12 is shown provided with large cavity 28, similar to cavity 30, disposed in mold half 14. Smaller cavity 32, similar in shape to cavity 28, is also carried by mold half 12, and is similar to cavity 34, carried by mold half 14. Passageway 36 communicates with cavity 28 and 32, as does passageway 38 communicate with cavity 30 and 34. When mold 12 and 14 are closed, so as to have lateral face 20 engage face 22, cavity 28 is superimposed over cavity 30, and cavity 32 is superimposed over cavity 34. Passageway 36 is also superimposed over passageway 38. As shown, fishing hook 40 is shown having barb end 42 carried in cavity 28. Line 44 is shown engaged in line receiving eye 46 of fishing hook 40, and is retained in cavity 32. Line 44 may be of any desired length, extending outwardly from open mouth portion 48, of cavity 32. Cavity 28 is provided with open mouth portion 50. Cavity 30 is similarly provided with open mouth portion 52. Cavity 34 is provided with open mouth portion 54, similar to open mouth portion 48, of cavity 32. Thus, when mold half 12 is closed engaging mold half 14, open mouth portions 48 and 54 are disposed adjacent one another providing a major open mouth portion having a size greater than open mouth portions 48 and 54. Similarly, open mouth portions 50 and 52 combine to form a greater open mouth portion when mold halves 12 and 14 are closed over one another.

Figure 2:
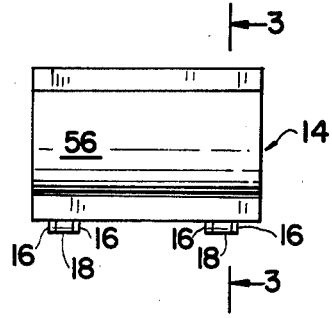
FIG. 2 is a plan view of the present invention shown in a closed condition.

FIG. 2 illustrates outermost lateral surface 56 of mold half 14. Hinge portions 16 are shown straddling hinge portions 18.

Figure 3:
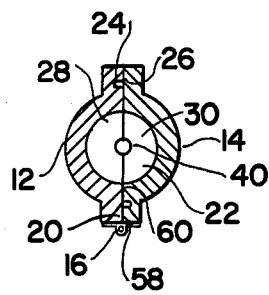
FIG. 3 is a side elevation cross sectional view, taken through lines 3—3, viewed in the direction of arrow 3—3, of the apparatus shown in FIG. 2.

FIG. 3 illustrates mold half 14 and mold half 12, shown in a closed condition such that protrusion 24 is shown disposed within opening 26. Pin 58 is shown passing through a portion of hinge portion 16. Opening 60 is shown in circular fashion, and is disposed adjacent lateral surfaces 20 and 22. Opening 60 is centered about passageway 40 and is centered thereabout. Fishing hook 40, shown in FIG. 1, is shown removed from the apparatus depicted in FIG. 3. Cavity portion 28 is disposed adjacent to cavity portion 30, making up opening 60, each being on opposite sides of surfaces 20 and 22. In similar fashion, cavities 32 and 34, shown in FIG. 1, have a circular cross section, but of some smaller diameter, to opening 60.

One of the advantages of the present invention is a bait molder for fishing hooks suitable for molding an edible material about a fishing hook such that the user's hand is never in danger of being caught upon the barb-like end of the hook.

Another advantage of the present invention is a bait mold which is inexpensive to manufacture, durable in construction, economical to use and well suited for its purpose.

Still another advantage of the present invention is a bait mold which can accommodate a variety of sizes of fish hooks therein.

Yet another advantage of the present invention is a bait mold which can mold bait onto fish hooks already strung onto lines.

A further advantage of the present invention is a bait hook which, because of its inexpensive cost, can be utilized to guard a fish hook when such hook is not in use.

Another advantage of the present invention is a fishing hook mold which may be easily cleaned.

Still another advantage of the present invention is a hook mold which permits the moldable edible material comprising the bait to be formed into the required shape utilizing only the thumb of the user.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A fishing hook bait mold comprising a first half body and a second half body, means to hingeably secure said half bodies together, each of said bodies having a lateral surface, means to have each of said half bodies dispose each lateral surface in touching engagement with each other, each said lateral surface having a first cavity and a second cavity, each said lateral surface having a passageway therein communicating to the interior of said first cavity and said second cavity, a first semispherical cavity and a second semispherical cavity being formed when said first half body and said second half body are pivoted into a closed condition wherein said lateral surfaces are juxtaposed, said first semispherical cavity having an open mouth portion, said second semispherical cavity having an open mouth portion, said open mouth portion of said first semispherical cavity being disposed opposite to said open mouth portion of said semispherical cavity, said first cavity of each of said half bodies forming said first semispherical cavity when said body halves are disposed in said closed condition, said second cavity of each of said half bodies forming said second semispherical cavity when said body halves are disposed in said closed condition, said passageway in each said lateral surface being disposed in juxtaposed relationship and extending transverse to said open mouth portions of said first semispherical cavity and said second semispherical cavity when said body halves are disposed in said closed condition, wherein a fishing hook having a line receiving eye end and a barbed carrying end and a shank portion thereinbetween, may have a portion of said shank portion carried within said passageway and may have said line receiving eye end and said barb carrying end selectively disposed within said first and said second semispherical cavities when said body halves are disposed in said closed condition.

2. The apparatus as claimed in claim 1 wherein said pair of half mold bodies comprises a plastic material.

3. The apparatus as claimed in claim 2 wherein said plastic material is polypropylene.

4. The apparatus as claimed in claim 1 further comprising a plurality of protrusions, said plurality of protrusions extending outwardly from said lateral surface of one said half bodies, said lateral surface of the other half body having a plurality of openings, said plurality of openings configured to receive said plurality of protrusions therein when said half bodies are disposed in said closed condition.

5. The apparatus as claimed in claim 1 wherein said first semispherical cavity is larger than said second semispherical cavity.

6. The apparatus as claimed in claim 1 wherein said open mouth portions are disposed extending transverse to the pivot axis of said pair of half bodies.

7. The apparatus as claimed in claim 1 wherein said open mouth portion of said first semispherical cavity is larger than said open mouth portion of said second semispherical cavity.

* * * * *